United States Patent [19]

Teraguchi et al.

[11] Patent Number: 5,456,453
[45] Date of Patent: Oct. 10, 1995

[54] FLOATING SECTION SUPPORT MECHANISM

[75] Inventors: Yuji Teraguchi; Yoshio Suzuki; Shigeo Kinoshita, all of Toda, Japan

[73] Assignee: Clarion Co., Ltd., Tokyo, Japan

[21] Appl. No.: 143,251

[22] Filed: Oct. 27, 1993

[30] Foreign Application Priority Data

Oct. 30, 1992 [JP] Japan .................................. 4-292402

[51] Int. Cl.⁶ .......................... G11B 33/08; G11B 33/02; B60R 11/02
[52] U.S. Cl. ........................................... 267/136
[58] Field of Search .............................. 267/136, 140.11; 248/580, 581, 584, 595, 478, 638, 583, 589, 592

[56] References Cited

U.S. PATENT DOCUMENTS

| | | | |
|---|---|---|---|
| 2,533,573 | 12/1950 | Gabel | 248/584 |
| 3,897,036 | 7/1975 | Nystrom | 248/584 |
| 5,039,051 | 8/1991 | Umebara | 248/478 |

FOREIGN PATENT DOCUMENTS

| | | |
|---|---|---|
| 63-65197 | 4/1988 | Japan . |
| 64-48791 | 3/1989 | Japan . |
| 2287993 | 11/1990 | Japan . |
| 4362588 | 12/1992 | Japan . |

*Primary Examiner*—Robert J. Oberleitner
*Assistant Examiner*—Clifford T. Bartz
*Attorney, Agent, or Firm*—Price, Gess & Ubell

[57] ABSTRACT

A guide plate having an arcuate groove (70) is fixed to the chassis. The guide groove (70) has a first bend (71) at one end, a second bend (72) at the other end, and a third bend (73) at an intermediate position therein. A slide member (8) is provided in the guide groove (70). A coil spring (61) is provided between the slide member (8) and an engagement member (11) of the floating section (1). The slide member (8) is engaged in one of the bends (72–73) in accordance with the angle of installation of a disc player to the horizon or vertical. The coil spring (61) is set so as to extend vertically at all times to support the floating section.

7 Claims, 14 Drawing Sheets

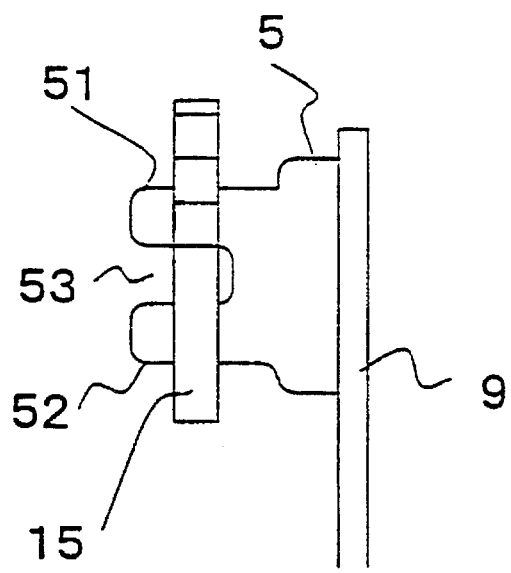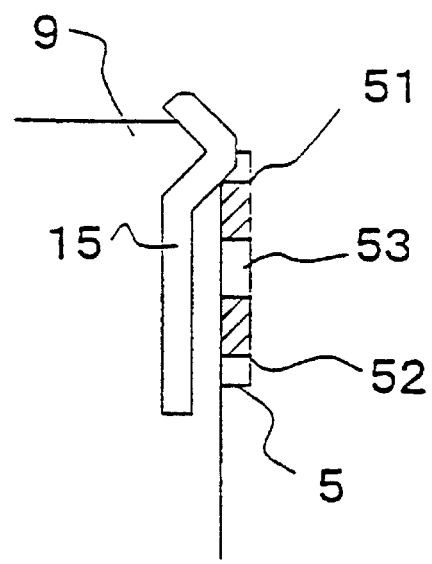
Fig. 6 ( A )   Fig. 6 ( B )

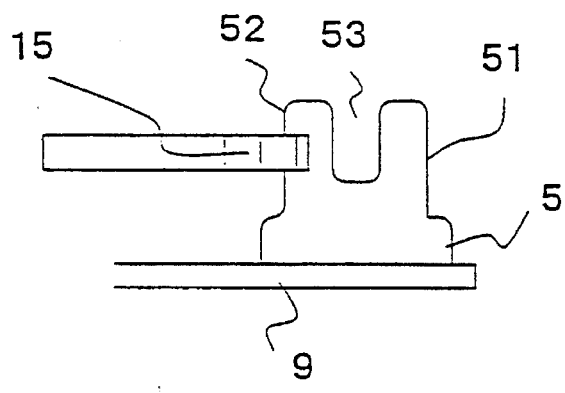
Fig. 8 ( A )
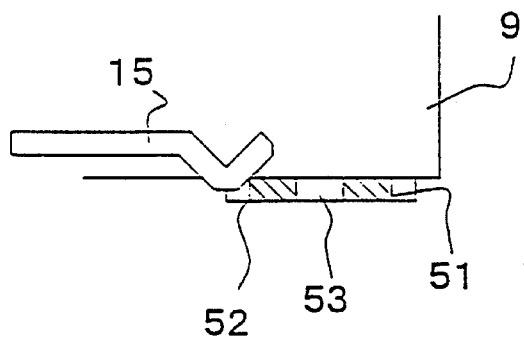
Fig. 8 ( B )

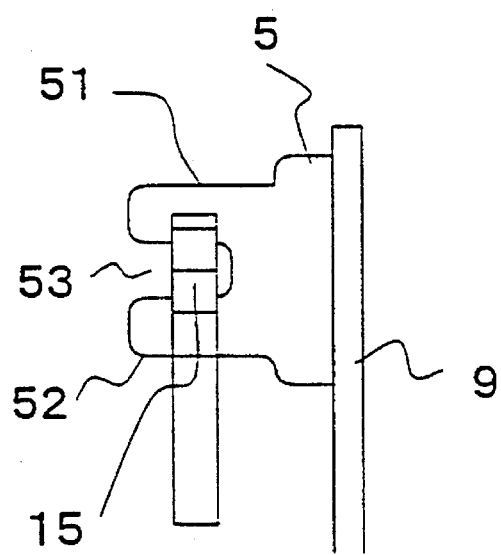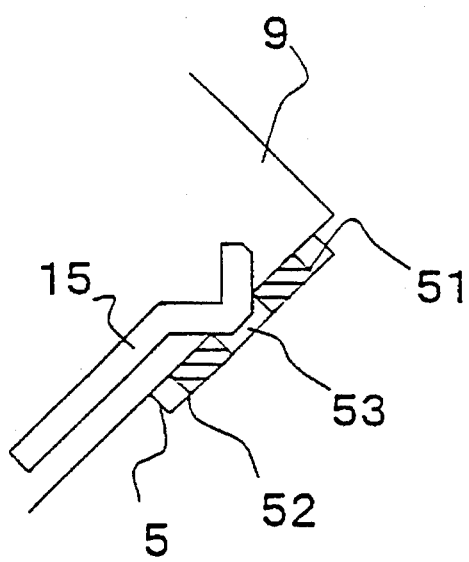
Fig. 10 ( A )   Fig. 10 ( B )

FLOATING SECTION SUPPORT MECHANISM

BACKGROUND OF THE INVENTION

The present invention relates to a support mechanism for a floating section, for example, of a vehicle-mounted disc player provided for prevention of sound skipping due to possible vibrations of the vehicle in disc signal reproduction.

Recently, a disc player is used which uses a recording medium such as a compact disc or a miniature disc for acoustics or video recording/reproducing purposes. This disc player is provided with a turntable which turns a disc and a pickup which senses a signal from the rotating disc. The turntable and the pickup are supported on a chassis of the disc player.

When this type of disc player is mounted on a vehicle, the following trouble would rise. When signals from a disc are reproduced in the vehicle-mounted disc player, possible vibrations of the vehicle can be transmitted to the turntable and pickup. In this case, the disc would rapidly deviate from the pickup to thereby render the reproduced sound discontinuous.

In order to solve such trouble in the vehicle-mounted disc player, a floating section on which the turntable and pickup are mounted is supported by vibration dampers on the chassis of the disc player. According to this structure, vibrations transmitted from the vehicle to the chassis are absorbed by the vibration dampers and are difficult to be transmitted to the turntable and pickup. The vibration dampers used are made of thin flexible rubber to absorb vibrations incoming in every direction.

However, it is difficult to support the overall load of the floating section with vibration dampers of thin rubber alone. The vibration dampers might be left deformed due to the load of the floating section to thereby disable absorption of such vibrations. Thus, such vehicle-mounted disc player is provided with a floating section support mechanism made of spring means such as coil springs which are disposed so as extend vertically or in the direction of action of gravity. The coil springs are engaged at an upper end with the chassis and at a lower end with the floating section. According to such structure, the coil springs support the load of the floating section, so that the load of the floating section does not directly act on the vibration dampers to thereby prevent deformation of the dampers and impairment of the vibration absorbing function.

The position where such vehicle-mounted disc player is attached must be changed depending on the kind and size of the vehicle on which the disc player is mounted. Thus, the disc player can be installed so as to extend vertically or horizontally, which means in this specification and claims that the disc player is installed such that its bottom surface is in a vertical or horizontal plane, as the case may be. The coil springs as the supporting mechanism for the floating section must be disposed so as to extend vertically at all times to cancel the load of the floating section. Thus, even if the direction of installation (or the tilt of the bottom surface) of the disc player changes, the coil springs are required to be installed so as to extend vertically. Thus, the floating section support mechanism Is preferably capable of altering the direction of extension of the coil springs relative to the floating section. Such floating section support mechanism is conventionally proposed by Japanese utility model application Hei 1-130225, corresponding U.S. application Ser. No. 07/610,516 being filed on Nov. 8, 1990. The floating section support mechanism of this application will next be described with respect to the drawings. As shown in FIG. 11, a floating section 1 with a turntable, etc., is provided within a chassis S of the disc player. The floating section 1 is supported on the chassis S by support rods 41–44 protruding from the periphery of the floating section 1 into vibration dampers 21–24 on the chassis S. In FIG. 11, a first coil spring 61 is provided on the left-hand side of the floating section while a second and a third coil spring 62 and 63 are provided on the right-hand side of the floating section.

First, the first coil spring 61 is provided between a link 31 provided on the chassis S and an engagement member 11 provided on the floating section. That is, the link 31 taking the form of a slightly long plate is provided rotatable around a pivot 31 attached to the chassis S. An engagement member 31b protruding toward the floating section 1 is provided on the link 31. The coil spring 61 is engaged at opposite ends with the engagement member 31b of the link 31 and the engagement member 11 of the floating section 1. The turning range of the link 31 is limited by a stop mechanism to a range between a position where the coil spring 61 extends in the same direction as the chassis and a position where the coil spring 61 extends so as to be perpendicular to the chassis. The stop includes a protrusion 31c provided on the link 31 and inserted into an opening in the chassis S. The protrusion 31c abuts on an edge of the opening to limit the turning range of the link 31.

The second and third coil springs 62, 63 are provided between corresponding links 32, 33 provided on the floating section 1 and the chassis S. The floating section 1 is provided with pivots 32a, 33a to which the corresponding links 32, 33 are attached rotatable at one end. The links 32, 33 have corresponding engagement members 32b, 33b formed at the other end thereof. The chassis S has on a side thereof engagement members 12, 13 which correspond to the engagement members 32a, 33a, respectively, with the coil springs 62, 63 being engaged at opposite ends with the corresponding engagement members 12, 13 and with the corresponding engagement members 32b, 33b. Also, the links 32, 33 are provided with corresponding stops 32c, 33c which limit the turning range thereof.

In operation, as shown in FIG. 12, when the disc player is installed vertically, the link 31 is turned around the pivot 31a to and engaged at a position where the first coil spring 61 extends in the same direction as the floating section 1, as viewed in a side view. Although not shown, the link 32, 33 are similarly turned around the pivots 32a, 33a to positions where the second and third coil springs 62, 63, respectively, extend in the same direction as the floating section 1, as viewed in a side view. This causes all the coil springs 61–63 to be disposed so as to extend vertically, so that the load of the floating section 1 is supported by the coil springs 61–63.

When the disc player is installed horizontally, as shown in FIG. 13, the links 31–33 are turned to and engaged at positions where the respective coil springs 61–63 extend so as to traverse the floating section 1, as viewed in a side view. This causes all the coil springs 61–63 to be disposed so as to extend vertically, so that the load of the floating section 1 is supported by the coil springs 61–63.

However, the above conventional floating section support mechanism has the following drawbacks: First, the stops which limit the turning range of the links engage the links at opposite ends of the turning range. Thus, when the disc player is installed horizontally, the respective links 31–33 are engaged at opposite ends of the turning range. Thus, the coil springs 61–63 are disposed so as to extend vertically even if the load of the floating section 1 is applied to the coils 61–63. However, when the disc player is installed tilted (in many cases, at about 45 degrees) to the horizon or vertical, the links are positioned intermediate the turning range and hence the turning operation of the links 31–33 cannot be stopped by the stop to thereby render difficult the support of the floating section by the coil spring 61.

In order to cope with this situation, a mechanism is conceivable in which a link is turned along arcuate grooves provided in the chassis S and floating section 1 and corresponding to the turning range of the link, and fastened by screws to the chassis S and floating section 1 at positions where the coils are at an angle of 45 degrees to the horizon or vertical in the course of turning of the link along the grooves. However, with such mechanism, the fastening operation with screws is required and the positioning operation of the link is troublesome.

To further simplify this mechanism, published unexamined Japanese patent application Hei 4-362588 has proposed that part of a groove 100 which guides the link is provided with a plurality of recesses 101–104, as shown in FIG. 14. A guide 105 provided in the link is engaged in any one of the recesses 101–104. Simultaneously, the guide 105 is pulled by the action of the coil spring 106 to be engaged in any one of the recesses 101–104 to thereby fix the link at an intermediate angle, for example, of 45 degrees. However, since in the conventional technique the groove is wider at recesses 101–104 than other groove portions, the guide 105 is slipped off from the recess where the guide 105 is engaged to thereby disable the fixing of the link, undesirably.

Second, in order to support the floating section 1 within the chassis, the coil spring is required to be provided on each side of the floating section. However, it is troublesome to set all the coil springs so as to extend vertically, each time the attitude of the disc player is altered. Published unexamined Japanese patent application Hei 2-297993 discloses a mechanism in which two pairs of coil springs are provided on the corresponding right- and left-hand sides of the floating section 1 to adjust the angle of one pair of coil springs simultaneously. That is, as shown in FIG. 15, a pair of turning links 203, 204 with corresponding coil springs 201, 202 is coupled by a single coupling link 205. By moving the coupling link 205 or one of the links 203, 204, the angles of the coil springs 201 and 202 are adjusted.

This conventional mechanism does not provide a structure in which the changing angles of the coil springs are fixed at an intermediate position in the movement thereof. Even if the changing angles of the coil springs may be fixed at an intermediate position in the course of the movement of the coil springs by a combination of the above-mentioned other techniques, fastening the link with screws is troublesome or the angle of the coil springs would change, undesirably. Since in this conventional technique the coupling link 205 is movable both longitudinally and transversely thereof, the space in which the coupling link 205 moves is wide and the miniaturization of the disc player is hindered.

SUMMARY OF THE INVENTION

It is therefore a main object of the present invention to provide a floating section supporting mechanism capable of supporting the floating section easily and securely in spite of an angle at which the disc player is installed.

It is another object of the present invention to provide a floating section supporting mechanism capable of disposing securely spring means such as coil springs so as to extend vertically without easy slippage of the guide off from a groove even if vibrations are applied to the chassis.

It is still another object of the present invention to provide a simple-structured floating section supporting mechanism capable of setting the angles of a plurality of spring means simultaneously and holding the set angles of the coil springs securely.

In order to achieve the above objects, according to one aspect of the present invention, there is provided a floating section supporting mechanism for a device, comprising:

a chassis having a circular-arc guide groove which has a plurality of groove bends therein having the same width as the groove;

a floating section placed within the chassis;

vibration damping means for damping possible vibrations transmitted from the chassis to the floating section;

a slide member slidably provided in the guide groove and engageable in any of the groove bends;

an engagement member provided on the floating section so as to be positioned near the center of a circle having a circular arc coincident with the arc of the guide groove; and spring means provided between the slide member and the engagement member.

By engaging the slide member in any one of the groove bends of the guide groove, the slide member is positioned in a state where the spring means extends vertically. In this case, since the guide groove and the groove bends are the same in width, the slide member is not slipped off from that groove bend even when vibrations are applied to the chassis. As a result, the load of the floating section is canceled by the spring means disposed between the chassis and the floating section so as to extend vertically to thereby reduce the load of the floating section on the vibration damping means.

According to a second aspect of the present invention, there is provided a floating section support mechanism for a device, comprising:

a chassis;

a floating section placed within the chassis;

vibration damping means for damping vibrations transmitted from the chassis to the floating section;

link means provided on the floating section, the link means comprising a turning link rotatable around a pivot provided on the floating section and a linearly moving link coupled through coupling means to the turning link;

spring means provided between the link means and the chassis means;

first engagement means provided on the link means; and second engagement means provided near the link means for engaging the first engagement means at a plurality of points.

The turning link is turned around the pivot such that the spring means extends vertically depending on the direction in which the device installed extends. In this case, in order to turn the turning link, the turning link may be directly pushed or the linearly moving link is first pushed to thereby turn the turning link. In a state where the spring extends vertically, the turning link and the linearly moving link are locked by engagement of the first and second engagement members, such that the spring means is held so as to extend vertically at all times.

The first engagement means is provided on a linearly moving link and the second engagement means is provided on the floating section.

In this case, when the linearly moving link moves in conformity to the angle of installation of the device, the first engagement means provided on the linearly moving link is engaged with the second engagement means of the floating section. Thus, the linearly moving link and the turning link coupled to the former link are locked. As a result, the angle of the spring means set so as to extend vertically in conformity to the angle of installation of the device is held.

The coupling means which couples the turning link and the linearly moving means comprises a pin provided on the turning link and inserted movably in a slot provided in the linearly moving link and extending perpendicular to the direction in which the linearly moving means moves.

In this case, when the turning link makes a circular-arc motion, the pin provided on the turning link slides while pushing the linearly moving link. As a result, the circular-arc motion of the turning link is transformed to a linear reciprocal motion of the linearly moving link. If the linearly moving link is first moved, the slot pushes the pin to thereby cause the turning link to make a circular-arc motion. As just described above, by the simple slot-pin structure, the first engagement member of the linearly moving link is moved linearly to be locked in the second locking portion of the floating section.

The link means may include two turning links provided at corresponding positions on the floating section and a linearly moving link for coupling the two turning links. The spring means comprises two springs each provided between a respective one of the turning links and the chassis.

In this case, the link means includes the two turning links and the linearly moving link which couples the former two links. Thus, by moving any one of the turning links or the linearly moving link, the angles of the two springs provided to the corresponding turning links are changed at the same time.

BRIEF DESCRIPTION OF THE DRAWINGS

FIGS. 6(A) and (B) are a plan view and a side view, respectively, of a leaf spring and locking portions of FIG. S;

FIGS. 8(A) and (B) are a plan view and a side view, respectively, of a leaf spring and locking portions of FIG. 7;

FIGS. 10(A) and (B) are a plan view and a side view, respectively, of the leaf spring and locking portions of FIG. 8;

DETAILED DESCRIPTION

Figure 1:
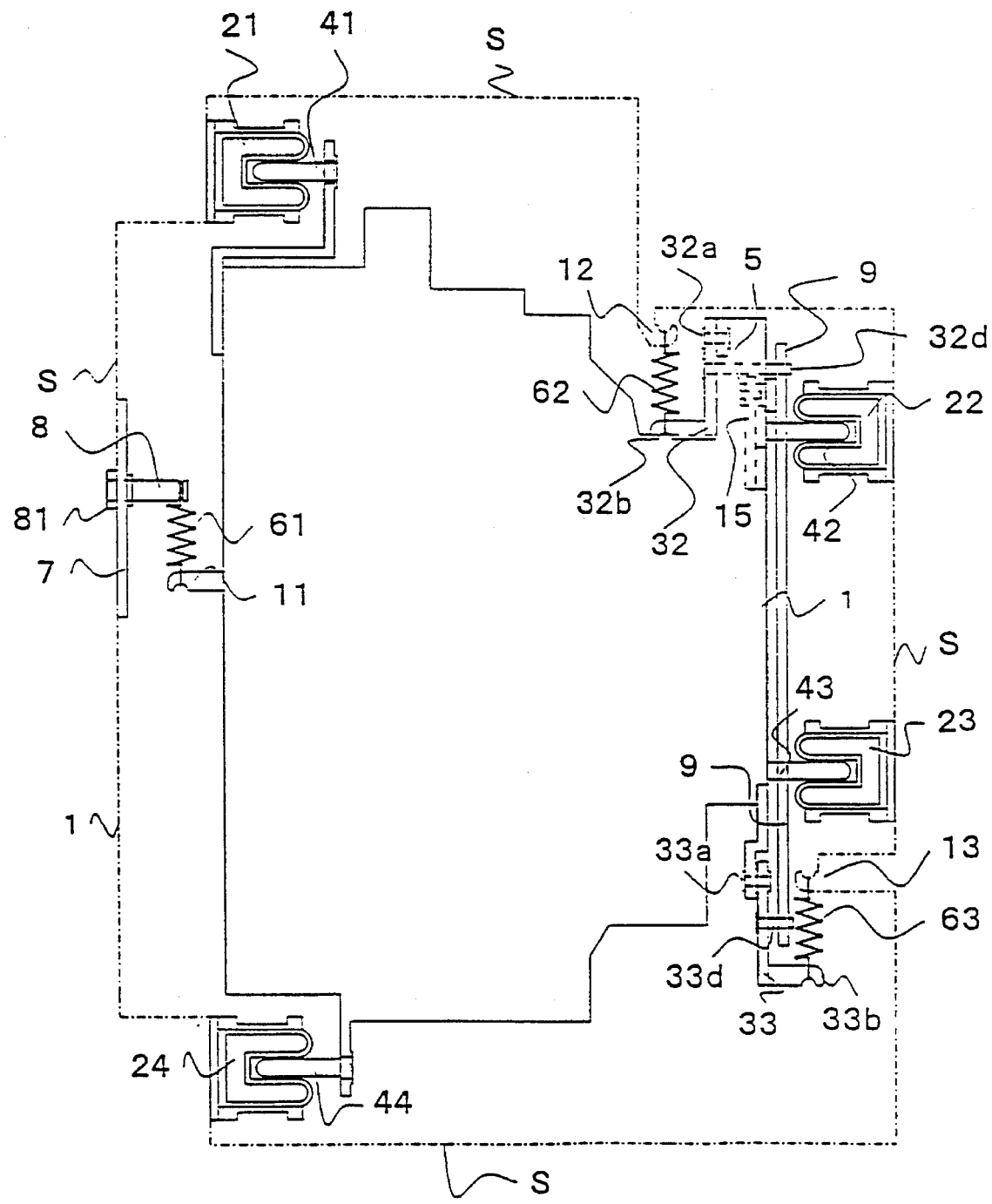
FIG. 1 is a plan view of a support mechanism for a floating section of a first embodiment of the present invention.

Embodiments of a floating section supporting mechanism according to the present invention will be described below with respect to the accompanying drawings. In the respective embodiments, spring means referred to herein includes a coil spring. A member of the embodiments similar to that of the conventional mechanism is identified by the same reference numeral as is used in the Figures directed to the conventional mechanism and further description thereof will be omitted.

(1) First Embodiment

Figure 2:
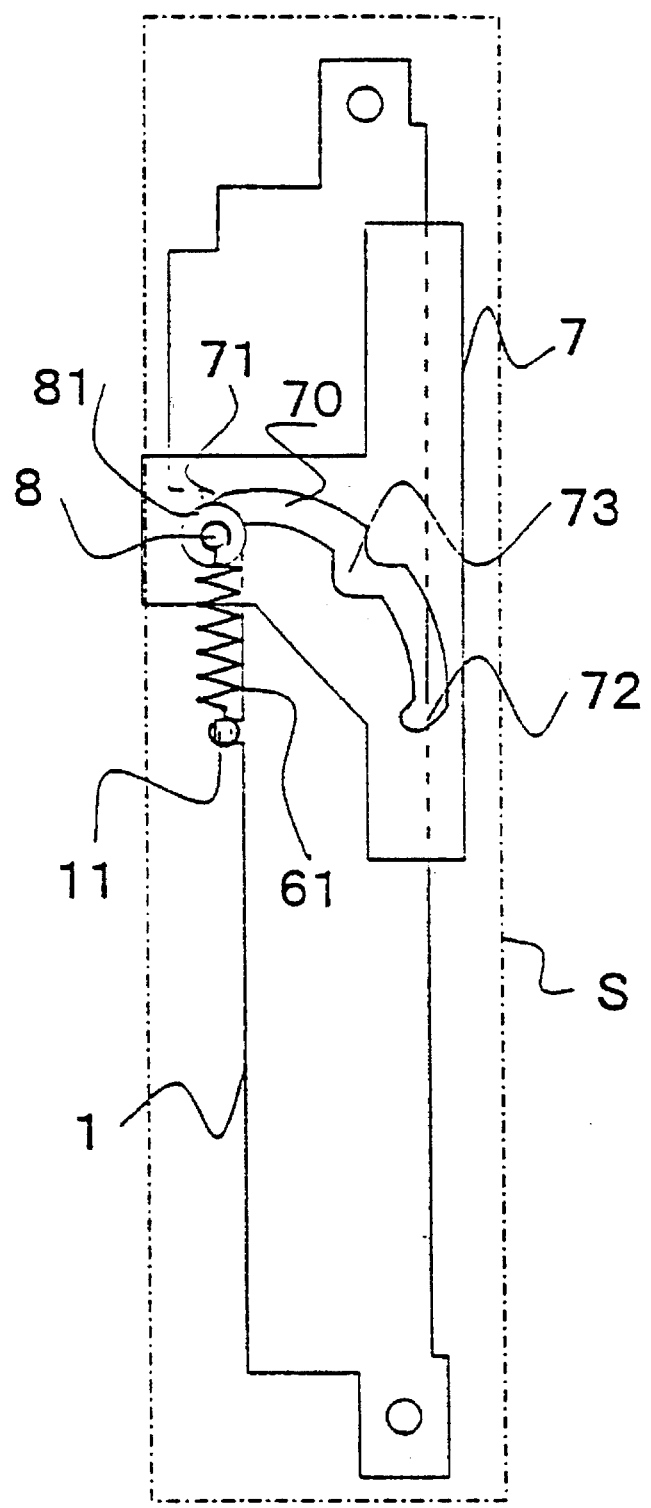
FIG. 2 is a side view of the support mechanism for the floating section which is set so as to extend vertically.

The structure of a first embodiment of the present invention will be described below. As shown in FIG. 1, a guide plate 7 is provided at a position opposite to an engagement member 11 of a floating section 1 on a side of a chassis S of a device such as a disc player. As shown in FIG. 2, the guide plate 7 has an arcuate groove 70 of about a quadrant which has a first bend 71 provided at one end of the guide groove 70, a second bend 72 at the opposite end of the groove, and a third bend 73 at an intermediate position in the groove. The guide groove 70 has a constant width even at respective bends 71–73. A pin-like slide member 8 is fitted slidable in the guide groove 70 and has a ring 81 attached thereto to prevent slippage of the slide member 8 off from the slide groove 70. The engagement member 1 of the floating section 1 is provided near the center of a circle having a circular arc coincident with the arc of the guide groove 70. The coil spring 61 which is spring means in the present invention is provided between the engagement member 11 and the slide member 8.

The first embodiment operates as follows: When the disc player is installed vertically, the floating section 1 extends vertically in FIG. 2. At this time the slide member 8 in the guide groove 70 is moved to be engaged in the first bend 71 at the end of the guide groove 70. This causes the coil spring 61 to extend in the same direction as the floating section 1 or vertically, so that the coil spring 61 suspends the floating section 1 from the chassis S. As a result, most of the load of the floating section 1 is supported by the coil spring and no load of the floating section 1 is applied to the rubber vibration dampers.

Figure 3:
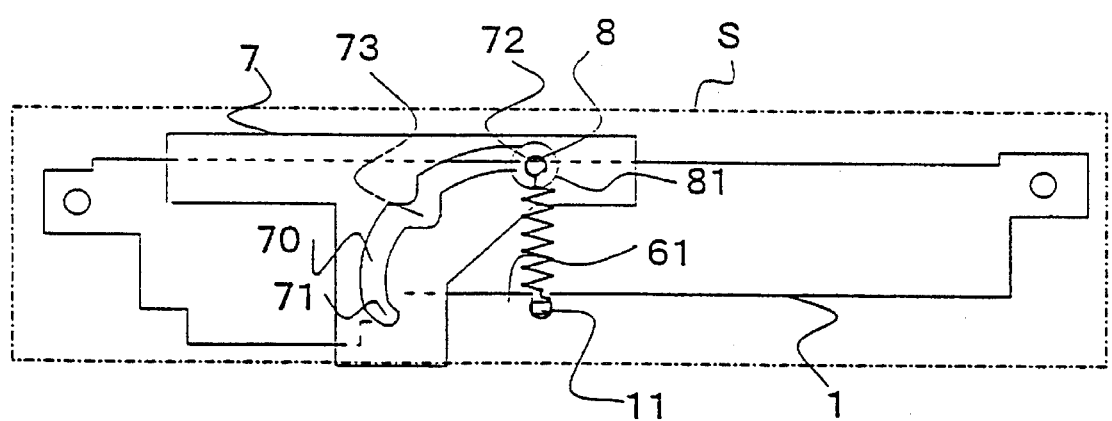
FIG. 3 is a side view of the support mechanism for the floating section which is set so as to extend horizontally.

When the disc player is installed horizontally, the floating section 1 extends so as to extend horizontally, as shown in FIG. 3. At this time, the slide member 8 in the guide groove 70 is slid to be engaged in the second bend 72 at the opposite end of the guide groove 70. This causes a damper spring 61 to extend vertically or in a direction perpendicular to the direction in which the floating section 1 extends. Thus, the coil spring 61 supports the floating section 1.

Figure 4:
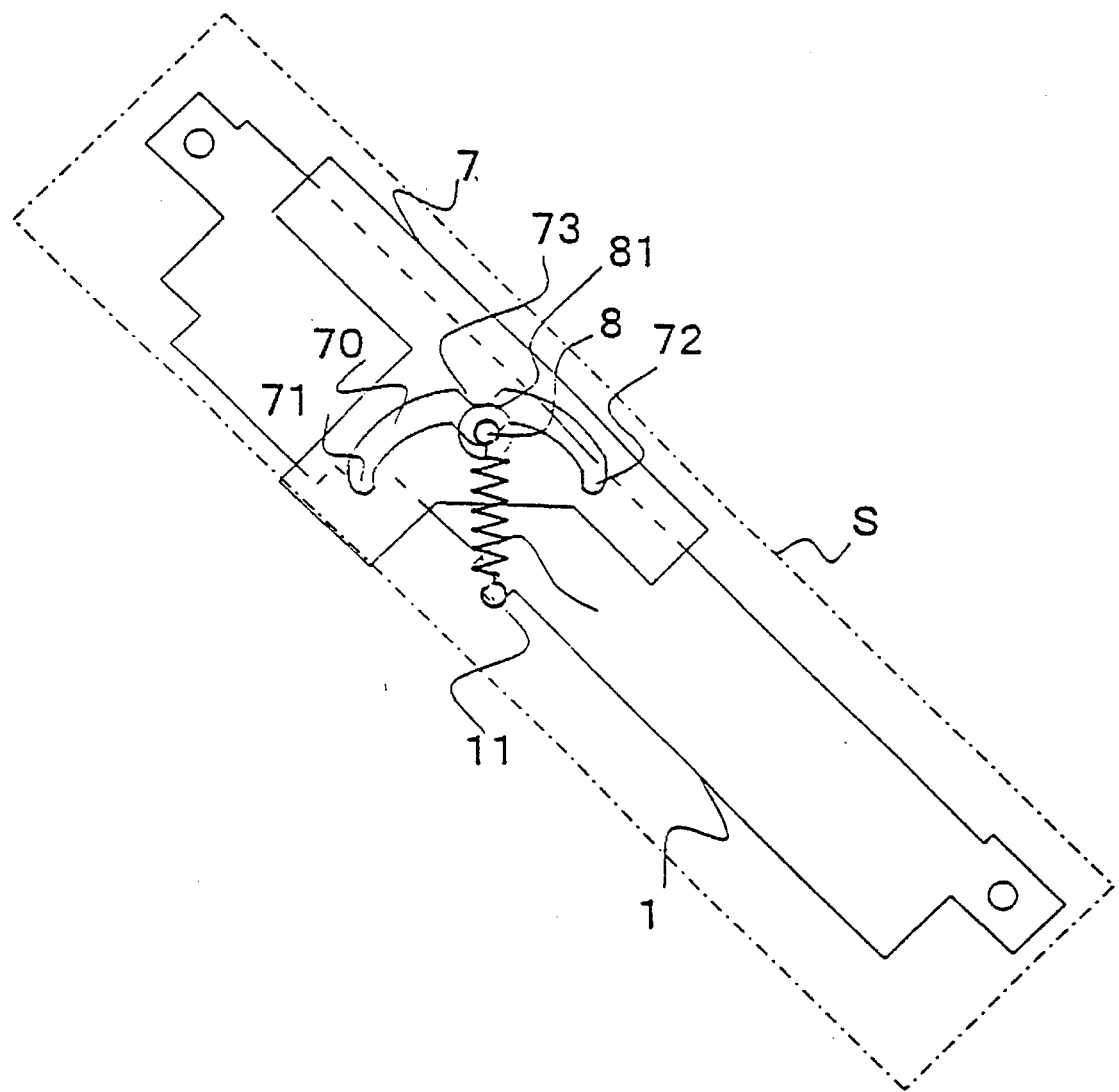
FIG. 4 is a side view of the support mechanism for the floating section which is set so as to extend at an angle of 45 degrees to the horizon.

When the disc player is used so as to extend at an angle of about 45 degrees to the horizon, the floating section 1 is tilted at an angle of about 45 degrees to the horizon, as shown in FIG. 4. At this time, the slide member 8 is slid in the guide groove 70 to be engaged in the third bend 73 of the groove 70. This causes the coil spring 61 to extend vertically or at an angle of 45 degrees to the floating section 1 to thereby cause the coil spring 61 to support the floating section 1.

The first embodiment produces the following effects: Since the direction in which the coil spring extends is determined by a single operation by engaging the slide member 8 in any particular one of the three bends, the operation is simple and the floating section 1 is securely supported. Even when the floating section 1 is used so as to extend at an angle of 45 degrees to the horizon, the coil spring 61 is held so as to extend vertically to thereby support the floating section 1. Especially, since the width of the guide groove 70 is the same even in the respective bends, the slide member 8 engaged in any particular one of the bends is not disengaged from that bend by vibrations and impacts applied to the disc player. As a result, the slide member 8 is kept so as to extend vertically at all times. Thus, even when the disc player is mounted on a vehicle which produces severe impacts of vibrations during travelling of the vehicle, the vibrations which are transmitted from the chassis to the floating section are isolated effectively.

(2) Second Embodiment

A second embodiment of the present invention will be described below. As shown in FIG. 1, small spaced slightly long plate-like turning links 32, 33 are provided on the opposite side of the chassis from its side on which the floating section support mechanism described in the first embodiment is installed. The links 32, 33 are supported at one end to the floating section 1 so as to be turnable around pivots 32a, 33a, respectively. The turning links 32, 33 are provided at the other end with engagement members 32b, 33b. The chassis S is provided with engagement members 12, 13 corresponding to the turning links 32, 33. Coil springs 62, 63 are provided across the engagement members 32b, 33b and the engagement members 12, 13, respectively.

The two turning links 32, 33 are coupled by a linearly moving link 9 provided slidably to the floating section 1 so as to turn together in the same direction. To this end, the turning links 32, 33 are provided with pins 32d, 33d, respectively, while the linearly moving link 9 is provided with two slots 92, 93 which extend so as to traverse the links 32, 33 and which receive the pins 32d, 33d. The two turning links 32, 33 and the linearly moving link 9 constitute link means in the present invention. The two pins 32d, 33d and slots 92, 93 constitute coupling means in the present invention.

Figure 5:
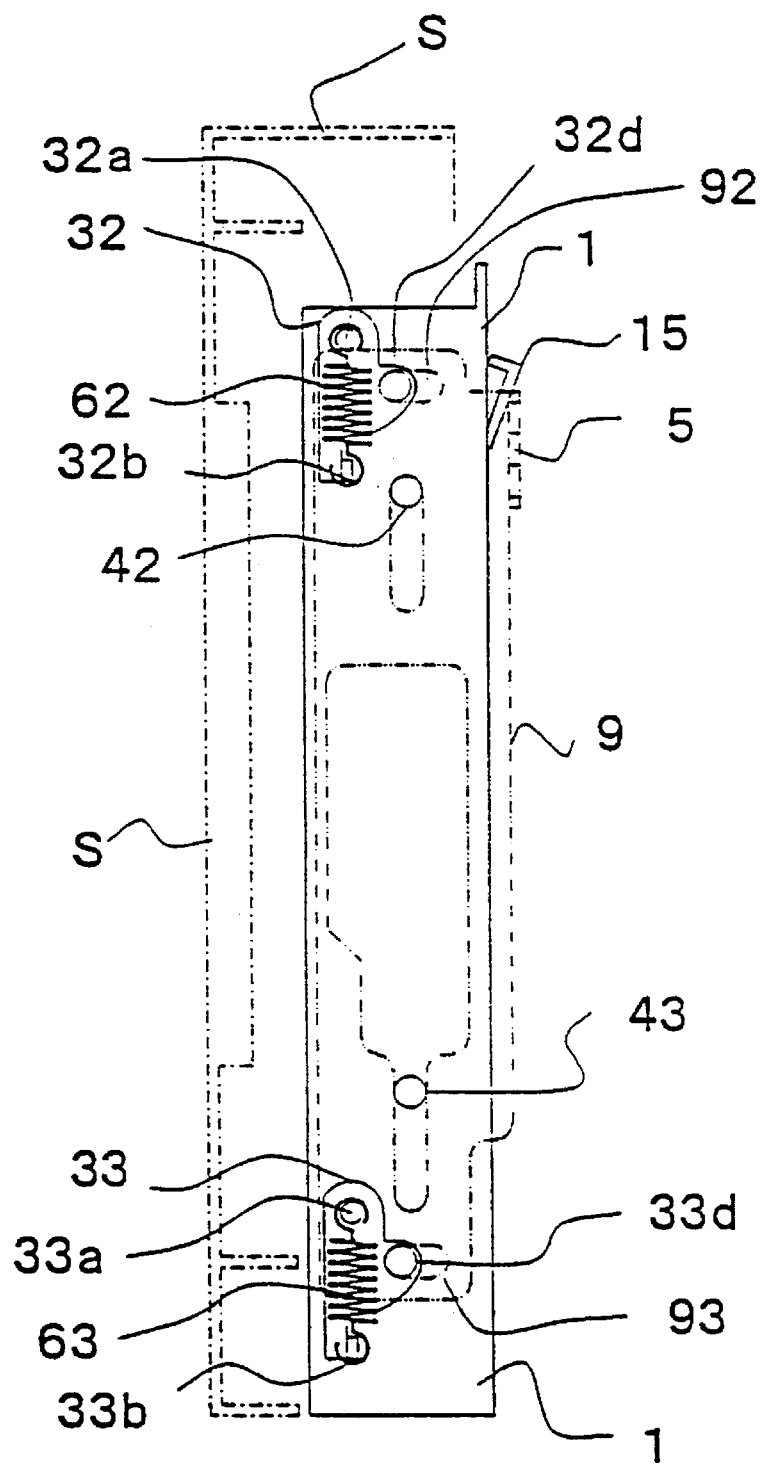
FIG. 5 is a side view of a support mechanism for a floating section of a second embodiment of the present invention with the floating section being set so as to extend vertically.

As shown in FIG. 6, the linearly moving link 9 is provided at one end with a locking plate 5 integral therewith. The locking plate 5 has two spaced protrusions. The locking plate 5 corresponds to first engagement means in the present invention and has three (first, second, third) locking portions 51, 52, 53 constituted by the two spaced protrusions. The first lock portion 51 is an outer edge of one protrusion provided on the locking plate 5 and functioning when the disc player is installed vertically. The second locking portion 52 is an outer edge of the other protrusion provided on the locking plate 5 and functioning when the disc player is installed horizontally. The third locking portion 53 is a space between those protrusions 51 and 52 and functioning when the disc player is installed tilted at an angle of 45 degrees to the horizon. As shown in FIG. 5, the floating section 1 is provided with a leaf spring 15 which faces the lock plate 5. The leaf spring 15 corresponds to second engagement means in the present invention. It has a key-like bent end which is adapted to engage any particular one of the locking portions 51–53.

The second embodiment functions as follows. When the disc player is Installed vertically, the floating section 1 extends vertically. Any one of the linearly moving link 9 or the two links 32, 33 coupled to the link 9 is moved to turn the turning links 32, 33 so as to extend in the same direction as the floating section 1. This causes the two coil springs 62, 63 to extend vertically, so that the floating section 1 is supported by the coil springs 62, 63. At this time, as shown in FIGS. 6(A), (B), the bent portion of the leaf spring 15 engages the first locking portion 51 provided on the linearly moving link 9 to thereby lock the turning links 32, 33 and the coil springs 62, 63.

Figure 7:
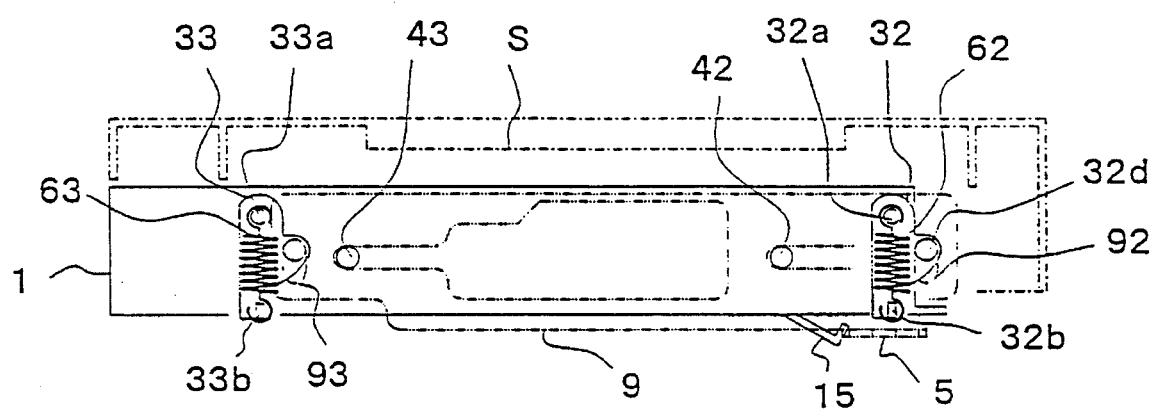
FIG. 7 is a side view of the support mechanism for the floating section as the second embodiment with the floating section being set so as to extend horizontally.

As shown in FIG. 7, when the disc player is installed horizontally, the floating section 1 extends horizontally. In this case, when the two turning links 32, 33 are turned until they extend in a direction in which they traverse the floating section 1, the two coil springs 62, 63 extend vertically to thereby support the floating section 1. At this time, as shown in FIGS. 8(A), (B), the linearly moving link 9 moves along with the turning links to cause the bent portion of the leaf spring 15 to engage in the locking portion 52 provided in the link 9 to thereby lock the turning links 32, 33 and the coil springs 62, 63.

Figure 9:
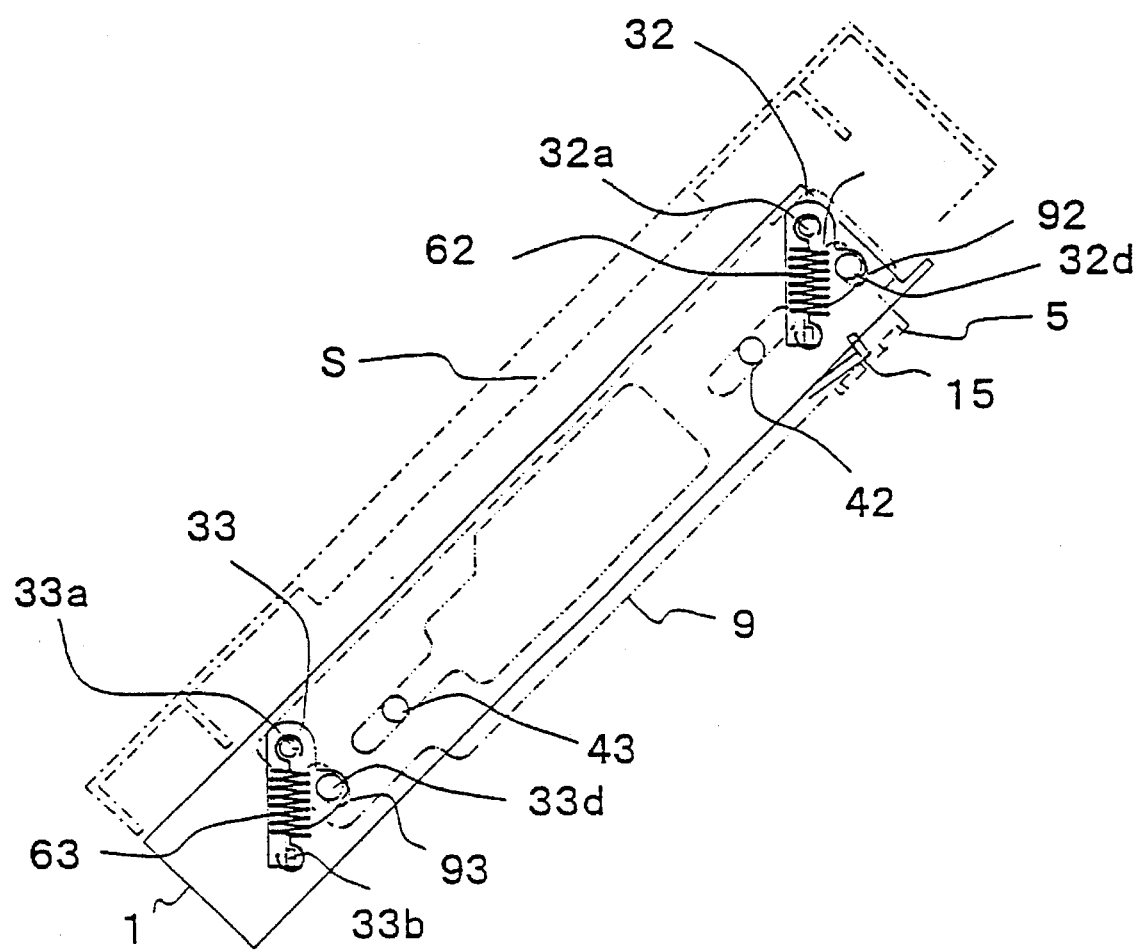
FIG. 9 is a side view of the support mechanism for the floating section as the second embodiment with the floating section being set so as to extend at an angle of 45 degrees to the horizon.
Figure 11:
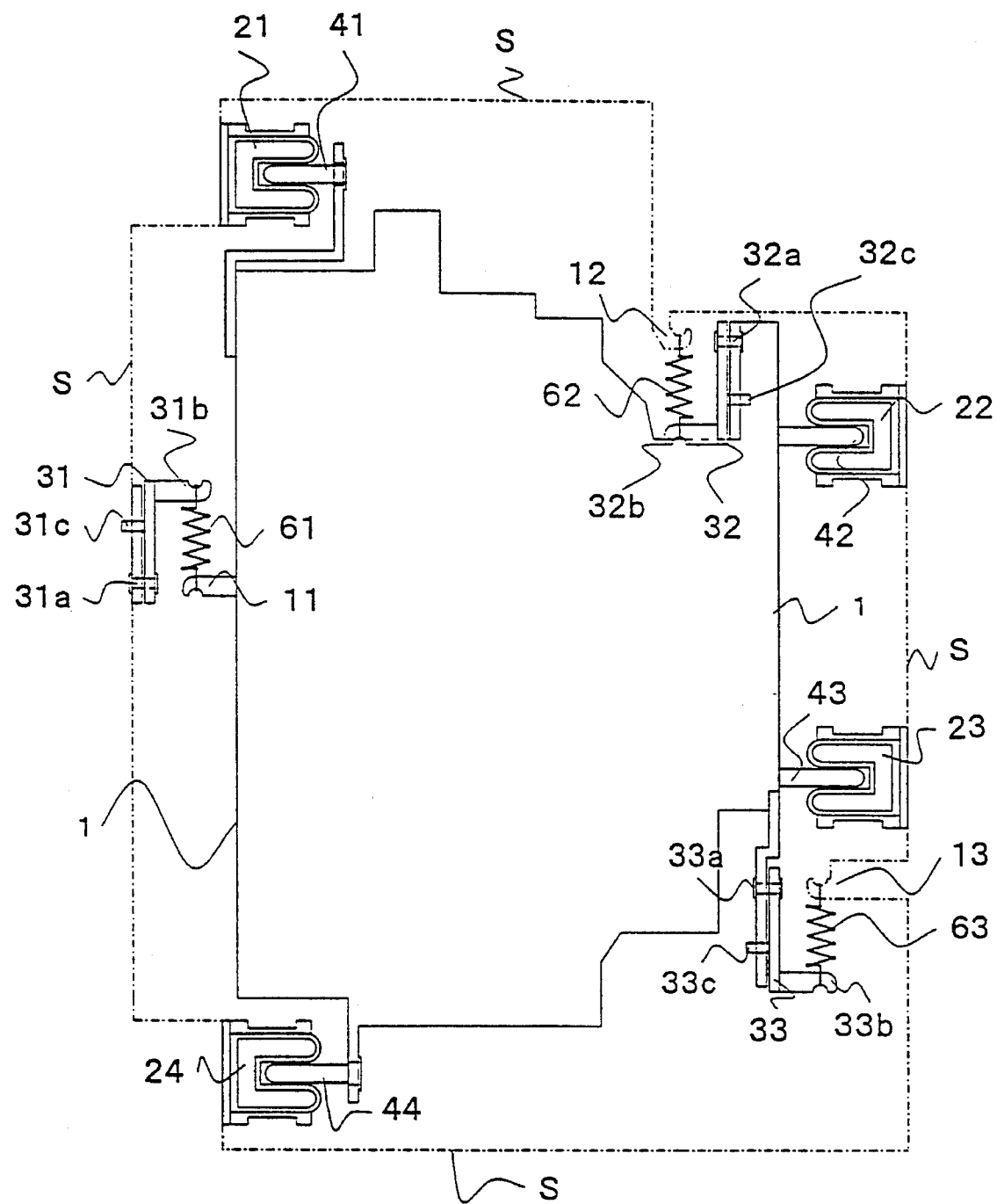
FIG. 11 is a plan view of one example of a conventional support mechanism for the floating section.
Figure 12:
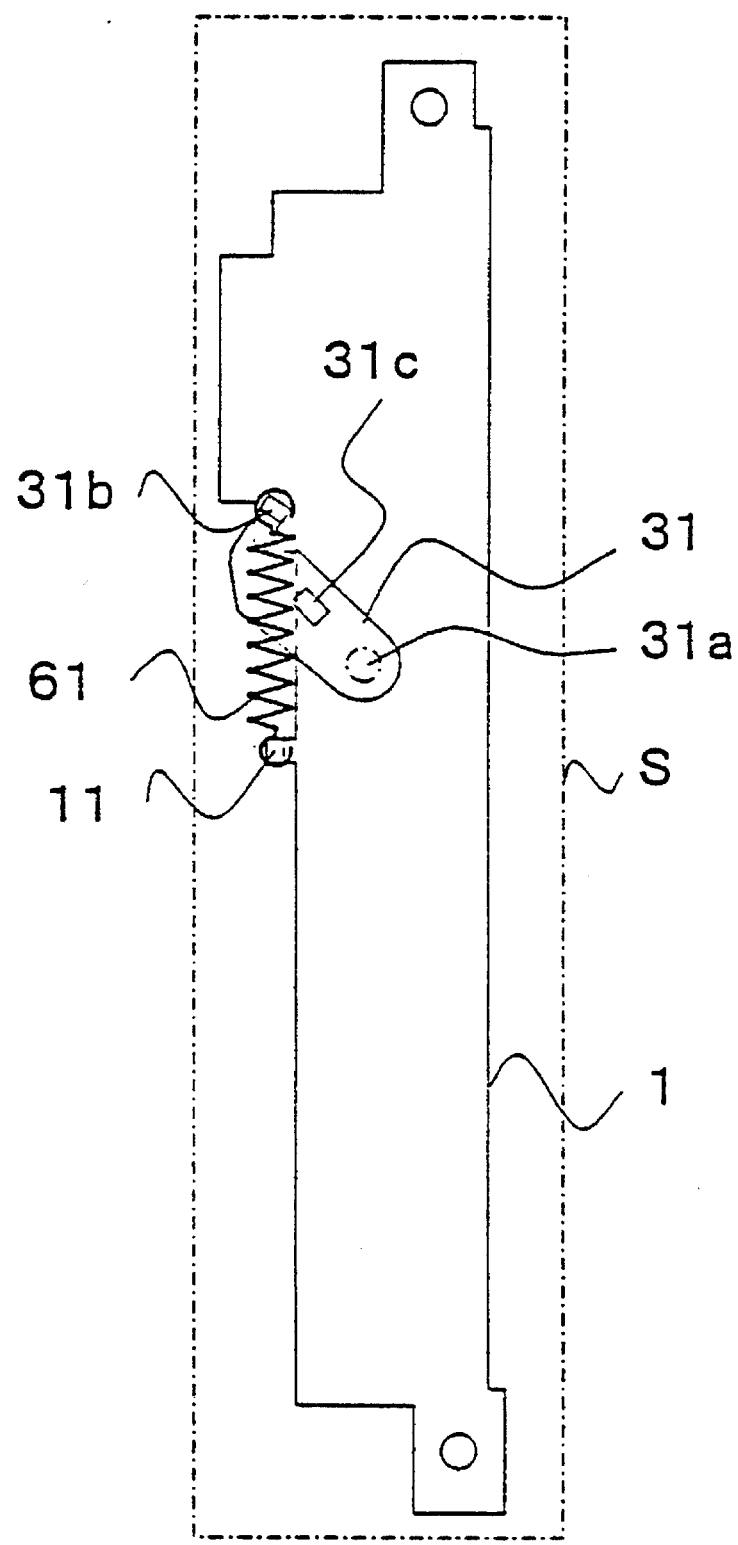
FIG. 12 is a side view of the conventional support mechanism for the floating section which is set so as to extend vertically.
Figure 13:
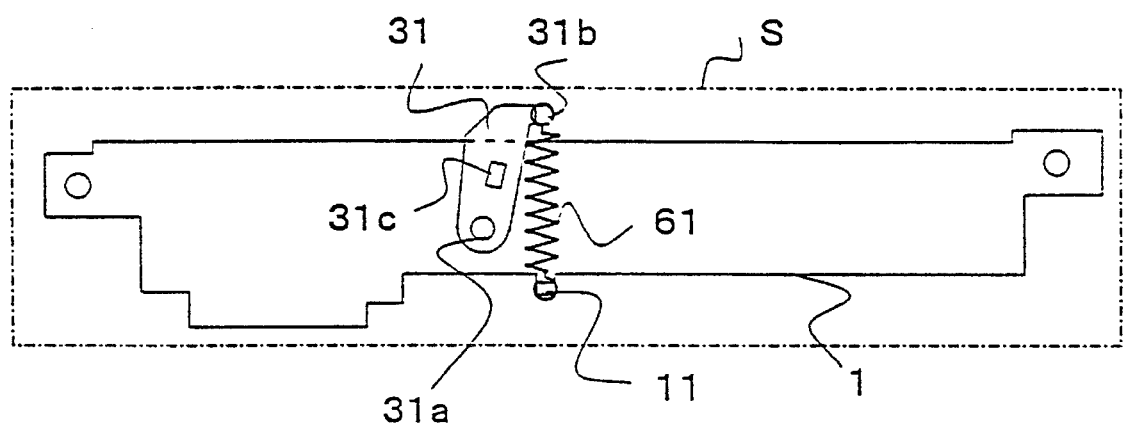
FIG. 13 is a side view of a conventional support mechanism for the floating section which is set so as to extend horizontally.
Figure 14:
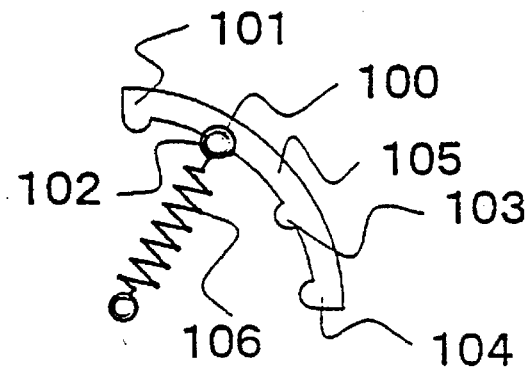
FIG. 14 is a side view of the conventional support mechanism for the floating section disclosed in published unexamined Japanese patent application Hei 4-362588.
Figure 15:
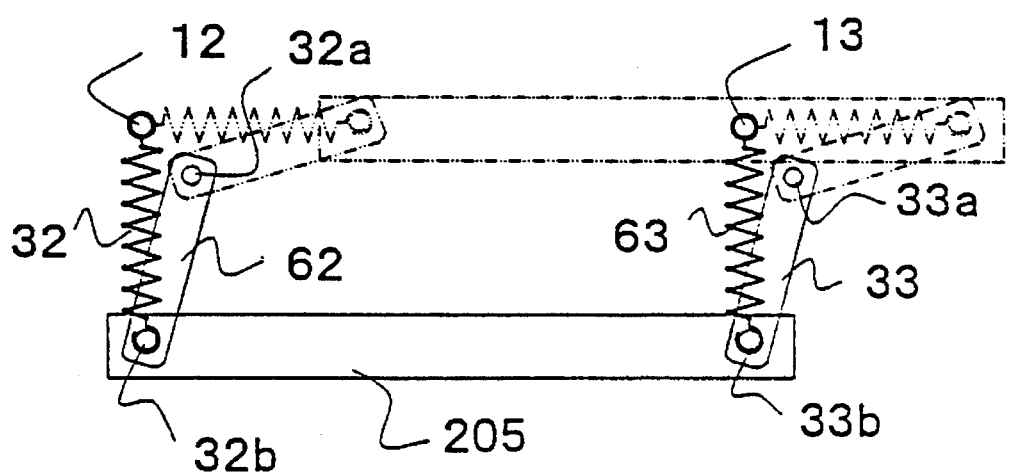
FIG. 15 is a side view of the conventional support mechanism for the floating section disclosed in published unexamined Japanese patent application Hei 2-287993.

As shown in FIG. 9, when the disc player is installed tilted, the floating section 1 extends at an angle of about 45 degrees to the horizon. In this case, when the turning links 32, 33 are turned until they extend at an angle of about 45 degrees to the floating section 1, the two coil springs 62, 63 extend vertically to thereby support the floating section 1. At this time, as shown in FIGS. 10(A), (B), the leaf spring 15 on the floating section 1 side is engaged at its bent portion with the third locking portion 53 provided on the link 9 to thereby lock the turning links 32, 33 and the coil springs 62, 63.

The second embodiment produces the following advantageous effects: The coil springs 62, 63 are set so as to extend vertically in spite of the direction in which the disc player is Installed to thereby support the load of the floating section 1 with the coil springs 62, 63. As a result, most of the load of the floating section 1 is not applied to the rubber vibration dampers to thereby prevent impairment of the dampers, further a so-called shockproof feature can be improved. Since the three locking portions 51–53 provided on the linearly moving link 9 and the leaf spring 15 of the floating section 1 function to lock the coil springs 62, 63, the set angles of the coil springs do not change even when vibrations/impacts are applied to the coil springs. Since the two turning links 32, 33 are coupled by the single linearly moving link 9, the angles of the two coil springs are set at the same time only by moving the link 9. That is, the angles of the coil springs are easily changed. Especially, since the angle of the coil springs are changed only by the straight movement of the link 9 with a user's finger, operation is simple. Since the link 9 moves straight, a dedicated space In the disc player required for such movement of the link 9 is small and the player is miniaturized. Further, by incorporating the first and second embodiments into a disc player, the floating section 1 is supported more effectively.

(3) Modifications

The present invention is not limited to the above embodiments. The shapes, sizes, etc., of the respective elements are changeable as required. For example, the following modifications are possible:

1) The coil springs are settable at various angles by Increasing the number of bends provided in the guide groove 70 In the first embodiment and the number of lock portions of the second embodiment.
2) The guide groove 70 in the first embodiment may be provided directly in the chassis.
3) The locking portions of the second embodiment may be provided at ends of the turning links 62, 63 while the locking portions may be provided on the floating section. The leaf spring may be provided on the link means.
4) The means for coupling the turning links and the linearly moving link is not limited to the pin-slot combination. The pin may be provided on the linearly moving link while the slots may be provided in the turning links.
5) The second embodiment may be modified such that three or more turning links and the coil springs may be moved by a single linearly moving link. Conversely, the single turning link and the coil springs may be moved by a linearly moving link.
6) The present invention is applicable to not only acoustic devices such as disc players and vehicle-mounted devices but also any devices which include a floating section supported by vibration dampers made of an elastic material within the chassis.

As described above, according to the present Invention, there is provided a simple-structured floating section support mechanism capable of securely supporting a floating section In spite of the angle of installation of a device and altering the angle of its installation easily.

What is claimed is:

1. A floating section supporting mechanism for a device, comprising:
   a chassis having an arcuate guide groove which has at least one bent portion, the width of the arcuate groove being substantially constant throughout;
   a floating section placed within the chassis;
   variation damping means for damping vibration transmitted from the chassis to the floating-section;
   a slide member slidably provided in the guide groove and engageable in said bent portion;
   an engagement member provided on the floating section so as to be positioned near the center of a circle having a circular arc coincident with the arc of the guide groove; and
   spring means provided between the slide member and the engagement member.

2. In a mounting apparatus for isolating a device from vibrations by the use of vibration damping means, the improvement comprising:
   a guide plate having an approximately arcuate groove, the groove has at least one bent portion, the width of the arcuate groove being substantially constant throughout, said bent portion positioned intermediate the length of the groove, with opposite edges of the groove extending transverse to the arcuate configuration, the guide plate can be attached to a supporting structure and the arcuate groove can enable a mounting of the device at different orientations to the supporting structure;
   a slide member is captured within the groove and is selectively movable along the groove; and
   a spring means can be removably attached to the device and to the slide member to assist in supporting the weight of the device whereby the slide member can be positioned at the bent portion to support the device.

3. The invention of claim 2 further including a ring member attached to the spring means of a greater diameter than a width of the groove to fix the slide member within the groove.

4. The invention of claim 2 wherein opposite ends of the groove are indented to define, respectively, support positions for the device when rotated 90°.

5. The invention of claim 2 wherein the guide plate has an approximate T-configuration.

6. The invention of claim 3 wherein opposite ends of the groove are indented to define, respectively, support positions for the device when rotated 90°.

7. The invention of claim 6 wherein the guide plate has an approximate T-configuration.

* * * * *